(12) United States Patent
McPherson

(10) Patent No.: US 7,690,161 B2
(45) Date of Patent: Apr. 6, 2010

(54) STRUCTURAL MEMBER FOR VEHICLE

(75) Inventor: Gary M. McPherson, Wrightstown, PA (US)

(73) Assignee: Load Rite Trailers, Inc., Fairless Hills, PA (US)

( * ) Notice: Subject to any disclaimer, the term of this patent is extended or adjusted under 35 U.S.C. 154(b) by 198 days.

(21) Appl. No.: 11/697,906

(22) Filed: Apr. 9, 2007

(65) Prior Publication Data

US 2008/0246263 A1 Oct. 9, 2008

(51) Int. Cl.
*E06B 3/00* (2006.01)

(52) U.S. Cl. ............................. 52/208; 52/837; 52/364; 52/376

(58) Field of Classification Search .................. 52/837, 52/364, 208, 376
See application file for complete search history.

(56) References Cited

U.S. PATENT DOCUMENTS

| | | | |
|---|---|---|---|
| 1,377,891 A | 5/1921 | Knight | |
| 1,561,126 A | 11/1925 | Timm | |
| 2,909,054 A | 10/1959 | Phillips | |
| 4,005,941 A | 2/1977 | Laborde | |
| 4,156,999 A * | 6/1979 | Avery | 52/376 |
| 4,159,604 A | 7/1979 | Burrell | |
| 4,183,387 A | 1/1980 | Lenz | |
| 4,285,095 A | 8/1981 | Janson | |
| 4,333,289 A * | 6/1982 | Strickland | 52/364 |
| 4,408,922 A | 10/1983 | D'Alessio | |
| 4,430,019 A | 2/1984 | D'Alessio | |
| 4,483,111 A | 11/1984 | Mollerstrom | |
| 4,584,809 A | 4/1986 | Stanford | |
| 4,784,554 A | 11/1988 | Break | |
| 4,869,378 A | 9/1989 | Miller | |
| 5,233,807 A * | 8/1993 | Spera | 52/837 |
| 5,398,909 A | 3/1995 | Sandwith | |
| 5,634,300 A | 6/1997 | Huebner et al. | |
| 5,654,876 A | 8/1997 | Sathe et al. | |
| 5,754,400 A | 5/1998 | Sathe et al. | |
| 5,823,559 A * | 10/1998 | Priesgen et al. | 280/414.1 |
| 5,930,966 A * | 8/1999 | Wood et al. | 52/364 |
| 5,931,726 A | 8/1999 | Peters | |
| 6,494,658 B1 * | 12/2002 | Roy | 411/428 |
| D518,900 S * | 4/2006 | Barnett | D25/119 |
| 7,213,379 B2 * | 5/2007 | Carlson et al. | 52/837 |
| D586,927 S * | 2/2009 | Hockemeyer et al. | D25/126 |
| 2003/0042704 A1 * | 3/2003 | Higginson | 280/414.1 |
| 2003/0205019 A1 | 11/2003 | Becker et al. | |
| 2005/0179231 A1 * | 8/2005 | Roberts, Jr. | 280/414.1 |
| 2005/0284078 A1 | 12/2005 | Marsland | |

* cited by examiner

*Primary Examiner*—Richard E Chilcot, Jr.
*Assistant Examiner*—Mark R Wendell
(74) *Attorney, Agent, or Firm*—Paul & Paul

(57) ABSTRACT

A structural member for a vehicle has a slot extending into one structural wall thereof, for receiving and holding a bolt, wherein said structural member including said slot has been formed by extrusion. The slot extends the length of the structural member for slidably receiving the head of one or more bolts wherein the land area of each bolt head extends beyond the slot opening to overlay the wall area carrying the slot. Each bolt carries at least two flat faces below its head wherein the juxtaposed edges of the slot carrying wall retains, i.e., refrains, the bolt from rotating. The slot includes an interior wall or sidewalls continuous with the slotted structural wall. The structural member may include an I-beam, a rectangular tube, a C-channel and the like. Corners are radiuses and right angles are avoided to reduce or remove stress risers.

17 Claims, 5 Drawing Sheets

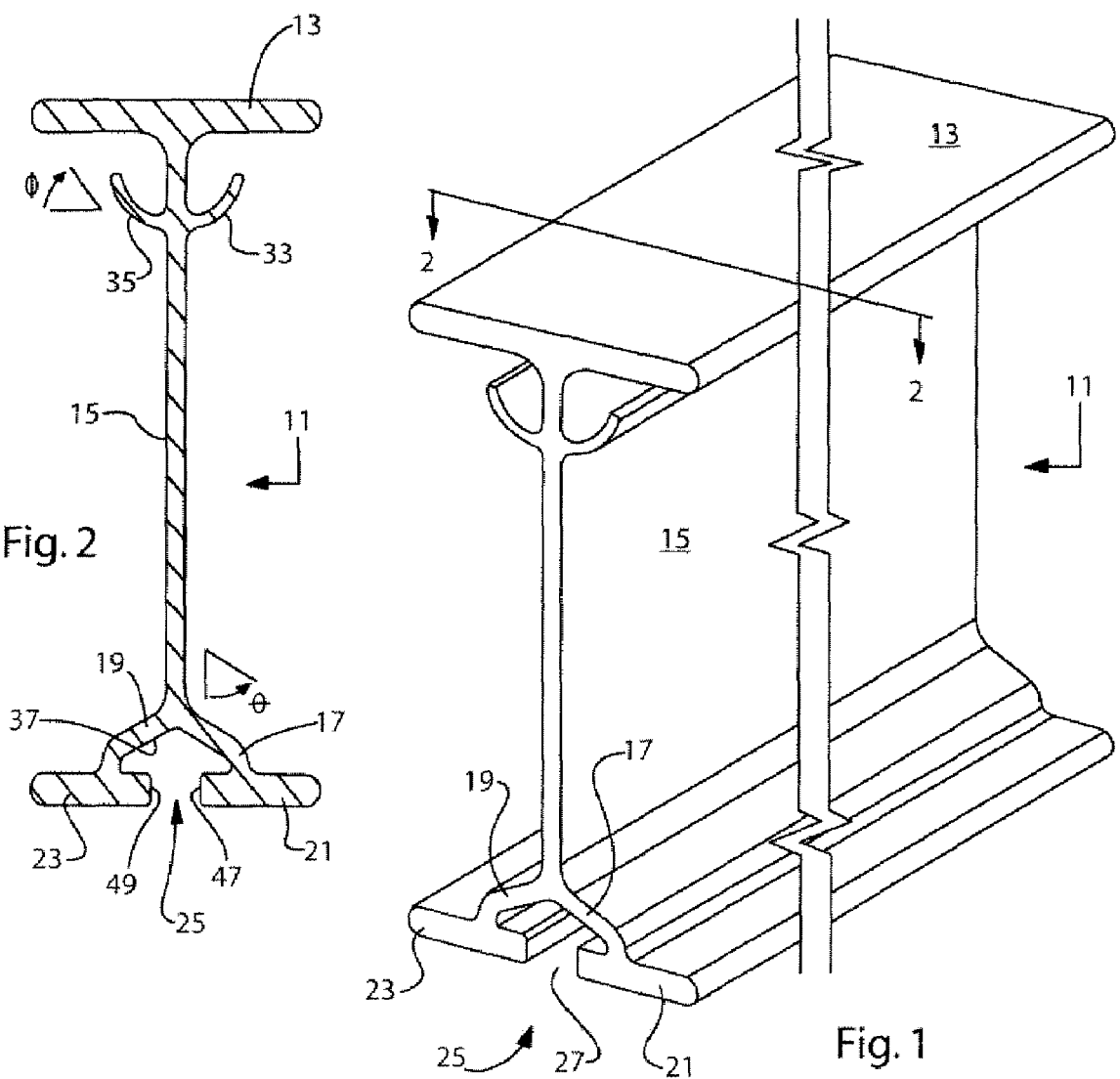

STRUCTURAL MEMBER FOR VEHICLE

BACKGROUND OF THE INVENTION

The present invention is directed to structural members for vehicles, including motor driven vehicles and trailers. In particular, it is directed to frame members for such vehicles, including boat trailers. Vehicle construction, including the design of frames and structural members for frames and sub-frames has evolved with improvements in the metallurgy of the materials which have also opened advances in manufacturing processes.

With the advent to high-strength, corrosion-resistant, aluminum alloys, structural members previously made from rolled steel have steadily given way to extruded aluminum alloy members. With these aluminum structural members being suitable for extrusion manufacture, not only has the weight of a vehicle been reduced, but the extrusion manufacturing has opened paths for making structural member shapes not previously practical in rolled members or cast members. Extrusion manufacturing has also eliminated stamping steps often used in steel member manufacturing.

Boat trailers, being on-the-road vehicles, are subject to DOT (U.S. Department of Transportation) regulations for strength, durability, and safety. Side rails and cross members, being the primary structural support members of a boat trailer frame, are subject to DOT standards as a part of certifying the entire trailer. The side rails and cross members form the frame (or skeleton) of a trailer to support the boat cradle members, to carry the hitch coupling, and to be connected to the wheel axel(s). A boat trailer frame is subject to many types of forces, from bending to torsion to compression to tensile forces. Not only must each member be strong enough to withstand these forces, but the couplings between members must also.

Painted steel tubing was used for many years for boat trailer side rails and cross members. To ward off corrosion and to enhance appearance, galvanized steel tubing steadily began to replace painted steel. However, zinc coatings can crack, are affected at weld points, and discolor with use. High strength, corrosion-resistant aluminum alloys have begun to be used for boat trailer structural members, including cross members and side rails. These aluminum structural members are more attractive than galvanized members at the off-set, and maintain their appearance longer. Extruded tubes, either C-channels or box-tubes, were first used. Recently an aluminum I-beam has been used for boat trailer side rails by Load Rite Trailers, Inc. of Fairless Hills, Pa.

The assembly of aluminum structural frame members on boat trailers has followed the assembly practices with painted steel and galvanized steel members. Namely, they were drilled through for bolts, punched for fasteners, welded, or clamped together with U-bolts. Not only are these assembly practices relatively labor intensive and therefore relatively expensive, the hardware use is costly. Moreover, once drilled or stamped or welded, the assembly positions became fixed and later adjustments are precluded. While U-bolts and clamps are adjustable, they are generally unsightly, and can work loose especially if struck being a catch point.

While an I-beam shape provides strength and rigidity, its cross-sectional configuration is awkward for attaching fenders, axels, load bearing cross bars, tie-down brackets, and the like, without through drilling the web or the top or bottom flanges and through bolting. Alternatively welding or clamping can be used. Such through drilling and bolting or such welding and heat treating adds to the cost of manufacturing and may weaken the beam or set up undesirable stress points (stress risers). U-clamping has the same short comings as with other structural members of other cross-sectional shapes.

What is desired is a structural member for a vehicle, including a C-channel, a tube, and an I-beam, which carries a slot in one wall, for holding a bolt or bolts, for joining thereto another structural member, or another component of the vehicle.

What is secondly desired is that such a slot hold the head of each bolt with the threads extending outwardly and also hold each bolt in position once the bolt is tightened with its mating nut, whereof such slot also holds the bolt from turning while the tightening process is carried out.

What is further desired is that such slot be capable of withstanding the forces applied to the structural member without a tear out of the bolt head.

What is even further desired is that such slot permits the structural member to be bolted to such trailer members as fenders, axels, load bearing cross bars, tie down brackets and the like.

Placing a slot in a structural member such as an I-beam, for holding a bolt or an anchor member is not new. These prior art slotted beams have been designed as building structural members and not for use in vehicles. Their designs depart from the scope and direction of the present invention.

Timm, U.S. Pat. No. 1,561,126, shows a channel for receiving and holding the square head of a stove bolt. Phillips, U.S. Pat. No. 2,909,054, shows a metal box with a slot for holding a concrete anchor. Burrell, U.S. Pat. No. 4,159,604, shows an aluminum joist with a slot for receiving and holding the hex-head of a machine bolt. Stanford, U.S. Pat. No. 4,584,809, shows a fabricated wood-metal composite I-beam with an extruded aluminum bottom flange, which has a T-shaped slot for receiving the head of a bolt. Janson, U.S. Pat. No. 4,285,095 shows a cruciform-shaped slot in a crane beam for receiving and holding a variety of members from a bolt to a trolley wheel. Marsland, U.S. Publication No. 2005/0284078 A1, shows an I-beam used as a structural joist having a slot in the bottom flange including notches for receiving the flange portion of the head of a bolt.

The Janson slot is large enough to accommodate a wrench placed on the head of a bolt when tightening the bolt, Phillips requires a clip to hold his anchor from turning.

Germane to the design of each prior art slot is the fact that each slot cavity has rectangular walls. This means that the walls transition at right angles Any lateral force exerted against a wall of these slots remains a strict bending moment (bending force). A tightened bolt has its head exert a permanent preloaded stress point in the weakest direction of the slot wall.

Timm, Burrell, Stanford and Marsland each require the shape of their slots, i.e., the walls of a respective slot, to hold their respective bolt heads from turning. Thus the sidewalls of these slots have corners of the bolt head providing a force pressing against the sidewalls as the bolt is tightened against them. When the bolt is fully tightened, there is a "preloaded" stress riser created by the abutment of the bolt head corners, which remains at that location of a respective sidewall.

If the tightening torque exceeds the strength of the sidewalls, the Timm, Burrell, Stanford and Marsland bolt heads can spin. If the forces imparted to these bolts create a further torque a sidewall could fail at a preloaded stress riser permitting the bolt to rotate.

The shape of the slots and the shape of the I-beam flanges in the above prior art are adequate for the static loading found in residential or commercial construction. However, they are undesirable for the dynamic loading, including the torque and bending moments, experienced by vehicle structural members, including frames and sub-frames, and also experienced by trailer side rails.

SUMMARY OF THE INVENTION

An object of the present invention is to provide a structural member for a vehicle with a slotted wall or flange for receiving and holding the head of a fastener, such as a bolt head. The bolt is intended to fasten another member to the slotted member. The structural member may be a C-channel, a rectangular or other shaped tube, or an I-beam, or a member of another cross-sectional shape.

The slot extends the length of the structural member and opens onto at least one end thereof, for slidably receiving one or more bolts, which are selectively postionable and repositionable along the slot. The land area of each bolt head is sufficiently large so that the overlay of the wall areas adjacent the slot is sufficiently large to greatly reduce or entirely eliminate any tear out.

The structural member of the present invention may be implemented in an I-beam shaped side rail for a boat trailer, In this conformation, the I-beam carries the slot in one flange thereof such as the bottom flange. The flange carrying the slot and holding the head portion of a selected bolt is intended to maximize the "tear out" area of the flange operated upon by the bolt; and to minimize "stress risers" caused by the bolt and the construction of the slot in the structural member.

Tear out is the amount of material which must give way for the fastener to break out of the slot. Stress risers are stress concentration points where failure is more likely to occur.

A commercially available carriage bolt is selected for use with the slotted I-beam utilized as the boat trailer side rail. The slot has a cavity formed by enclosed walls. However the enclosed walls of the present invention do not hold the fastener carriage bolt from turning and therefore are not subjected to lateral stress points, i.e., bending forces, created by the tightened fastener.

The slot is formed by bifurcating the bottom portion of the center web of the I-beam into a Y-shaped cross-section with two legs leading to the bottom flange. As the web is a "wall", the two legs forming the "Y" in cross-section are really two laterally running wall members which define a laterally extending cavity.

The slot opening is a longitudinal opening, on center with the center line of the I-beam web and extends the length of the bottom flange. The carriage bolt received within the I-beam extends through this slot. This means that the bottom flange is split into two parallel extending plate members separated by the slot. Each plate member is attached to a respective one of the slot cavity "Y" cross section walls extending downward from the upper portion of the I-beam web.

A carriage bolt type fastener has a square boss immediately below its head. The juxtaposed walls of the slot's longitudinal opening hold the fastener from turning. Thus the bolt tightening torque force is resisted by the edge of each bottom flange plate member, as a compression force developed in each plate member. This compression force is then distributed to the large area of the connection between each bottom flange plate member and its respective connected slot "Y" cross section wall member. This eliminates any stress concentration generated by a tightened carriage bolt. The force passed onto the walls of the Y-sectioned web has two components, compression and a bending force.

A carriage bolt has a large mushroom-shaped round head which overlaps the portions of the bottom flange plate members adjacent the slot. The diameter of a carriage bolt head is a little more than twice the diameter of its threaded shaft. This means that the "land area" of a carriage bolt head is considerably more than that for the heads of stove bolts and machine bolts.

The I-beam has rounded corners (corner radiuses). The Y-shaped section of the web extends at a gentle radius off of vertical wherein the two Y-shaped slot walls extending downward from the upper portion of the vertical web. The cavity in which the carriage bolt head slides also has radiuses at each corner. The land area of a carriage bolt head gives rise to more tear out area than a machine bolt or a stove bolt.

When the bottom flange is bolted onto an axle, or other member, the two-piece bottom flange is securely tied down by a plurality of carriage bolts and act as a unitary flange with respect to the strength of the I-beam.

A single curved wall, or a pair of curved walls extend outwardly and upwardly from the web at its upper region, just beneath the top flange Each longitudinal extending curved wall form a wire gutter extending the length of the I-beam, for conduits, shielded cables and wiring.

BRIEF DESCRIPTION OF THE DRAWINGS

The features, advantage and operation of the present invention will become readily apparent and further understood from a reading of the following detailed description with the accompanying drawings, in which like numerals refer to like elements, and in which:

FIG. 1 is a perspective view of the structural member of the present invention implemented as an I-beam;

FIG. 2 is a cross-sectional view of the I-beam taken as shown in FIG. 1,

DETAILED DESCRIPTION OF THE INVENTION

Figure 4:
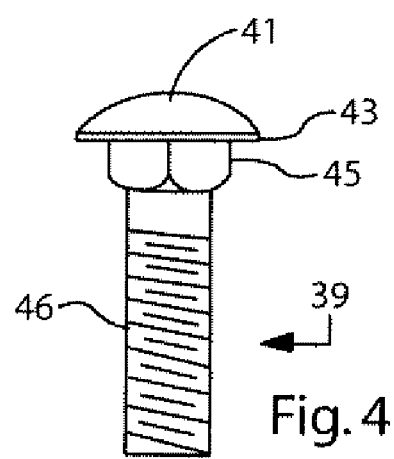
FIG. 4 is a side view of a carriage bolt used with the invention.

The present invention is a structural member for an on-the-road vehicle which includes elongate structural walls. The structural member is implemented as an I-beam shaped side rail for a boat trailer, FIG. 1. This I-beam, FIGS. 1, 2, 3 and 6 is made of extruded aluminum alloy, such as 6105-T5 or 6061-T6 alloy with a minimum hardness of Rockwell F85. The material is high strength and corrosion resistant. The size of the beam is determined by the design parameters for the trailer size and load, and can typically be a 5.25×3.0 inch; or a 6.25×3 inch; or a 7.0×4.0 inch I-beam, where the larger number is the nominal distance for the overall height, i.e., from the outside of the top flange to the outside of the bottom flange, and the smaller number is the nominal distance for the overall width, i.e., the width to the top and bottom flanges. Larger or smaller sizes will also be used commensurate with vehicle capacity requirements.

The I-beam 11, has a solid top flange 13, a vertical web 15 with a bifurcated, Y-shaped section with walls 17, 19 at its bottom region, terminating in a connection to two parallel extending bottom plates 21, 23 which form a composite bottom flange 25.

A slot opening 27 extends the length of the I-beam 11 and defines the spacing between the two parallel plates 21, 23 comprising the bottom flange 25.

The angle "θ" at which each leg 17, 19, of the Y-shaped portion of the web, extends outwardly from the vertical is between about 20 and 60 degrees. The outer edges of the bottom flange plates 21, 23 are rounded. A portion of each bottom flange plate 21, 23 projects inwards towards the I-beam centerline from its connection point with its respective Y-section legs 17, 19. This forms a lip 29, 31 on each respective bottom flange plate 21, 23 extending the length of the I-beam for engaging the land area of the head of a carriage bolt, FIGS. 3, 4, and 5.

In FIG. 2, the inverted Y-shaped structure formed by the cavity 37, i.e., the walls 17, 19 and the plates 21, 23 is isosceles triangle-shaped. A "Y" has equal legs extending at equal angles and as the angle "θ" is the same for each of the walls 17, 19, and the bottom flange plates 21, 23 extend in the same plane, i.e., are therefore sequential and parallel, the interior angle at which each wall 17, 19 meets its respective plate 21, 23, is the same. It is easily understood that if the angle "θ" is between 20 and 60 degrees for each wall 17, 19, the included angle, i.e., the interior angle at which the walls 17, 19 meet can be between 70 and 30 degrees, respectively. If the interior angle at which the walls 17, 19 meet is between 30 and 70 degrees, the interior angle at which the respective walls 17, 19 meet the respective bottom plates 21, 23 is between 55 and 75 degrees. It is also easily understood that the walls 17, 19 of the "Y" which extend from the vertical web 15 cannot be parallel to, or in the same plane as, the bottom plates 21, 23 which constitute the bottom flange 25 of the I-beam 11 and are, therefore, perpendicular to the vertical web 15 of the I-beam 11.

The Y-section walls 17, 19 and the lips 29, 31 of the bottom flange plates 21, 23 form a longitudinal running slot cavity 37, extending the length of the I-beam 11 on the centerline of the structure. The slot cavity has a mushroom-shaped cross-sectional shape with all walls meeting at angles having radiuses.

A single gutter 33 or a pair of gutters 33, 35 can be extruded into the I-beam 11 during manufacturing. These gutters 33, 35 have a uniform wall thickness, FIG. 2, and are each curved walls extending outwardly and upwardly from the top region of the web 15, on each side thereof, at a location just beneath the top flange 13. The gutters 33, 35 run the length of the I-beam 11. They are used to hold conduit, or cabling, or wiring. The curvature "φ" of each gutter 33, 35 extends upwardly to about 90 degrees from the horizontal.

The dimensional size and thickness of the individual members of an I-beam are maintained in a proportional relationship as the i-beam is sized larger or smaller, and the alloy from which the I-beam is extruded is modified in strength. For a 6.25×3.0 inch I-beam nominal sizes are as follows. The top flange 13 has rounded outside edges and is nominally 0.28 inches thick and 3.0 inches wide. The single wall upper portion of the web 15 is nominally 0.19 inches thick and about 5.2 inches high. The Y-section walls 17, 19 of the web are each nominally 0.19 inches thick and about 0.8 inches long. The slot opening is about 0.525 inches wide with each bottom flange plate being 0.28 inches thick and 1.24 inches wide.

Figure 5:
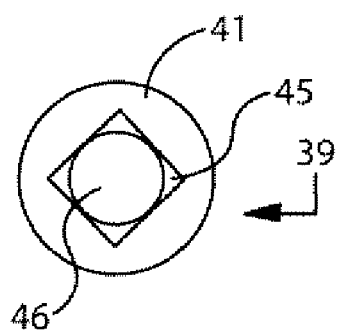
FIG. 5 is an end view of the carriage bolt showing the land area of the head.

The slot opening 27 opens into the mushroom-shaped cross-section cavity 37. All of the corners of the mushroom-shaped cavity 37 have radiuses. The height of the "dome" of the cavity 37 is about 60-75% of the height of the head 41 of the carriage bolt 39. A carriage bolt 39 has a round, low profile head 41, and a square boss 45 on the shaft, i.e., shank 46 of the bolt 39 with a plurality of flats. The carriage bolt 39 selected, FIGS. 4 and 5 is a grade-5 which has considerably more strength than a standard grade-2. Grade-5 manufacturing tolerances provide more exact dimensioning than a grade-2.

As an example, without limitation, a 1.5 inch×0.5 inch carriage bolt 39, FIGS. 4 and 5 can be used with the 6.25×3.0 inch I-beam. In further example, the mushroom-shaped head 41 of the carriage bolt 39 is about 0.26 inches high including the skirt 43. A square boss 45 is positioned between the threaded shank 46 of the bolt and the bottom of the head 41. The side dimension of this boss 45 is about the same as the diameter of the threaded shank, i.e., about 0.50 inches. The juxtaposed edges, 47, 49 of the bottom flange plates 21, 23 are squared-off and permit the carriage bolt 39 to be slid into the slot 27 and cavity 37. These edges 47, 49 abut the corners of the square boss 45 of the bolt 39 when the bolt is tightened. The clearance in the slot opening 27 is about 0.010-0.050 inches, i.e., a clearance sufficient to permit a bolt 39 to easily slide into the I-beam slot 27 and cavity 37.

Each of the locations where the top flange 13 and the vertical web 15 meet, where the web 15 forks into the Y-shaped walls 17, 19, the slight bend in the walls 17, 19 where they join the top face of each bottom flange plate 21, 23, and each of the interior corners of the cavity 37 have radiuses. As all corners have radiuses, stress risers are greatly reduced or eliminated at these locations.

A carriage bolt has a large land area, i.e., the "foot print" of its head. Typically, the head 41 diameter of the carriage bolt 39 is more than twice the diameter of the shank 46 as well as twice the length of an edge of the square boss 45, FIG. 5. When the head 41 is 1.06 inches in diameter, and the boss 45 is 0.50 inches on a side, the land area of the head 41, which is available for overlapping the lips 29, 31 of the bottom flange plates 21, 23 is more than twice the land area of a machine bolt head. This substantially increases the amount of tear out necessary to break away the flange plates 21, 23 and to pull a bolt out of the slot opening 25.

While a machine bolt, or a stove bolt could be substituted for a carriage bolt, and a machine screw washer added below the head, this would detrimentally change the shape of the head, require an increase in the dimensions of the cavity 37, require a change in the shape of the cavity 37, add another part and the cost of assembly, and eliminate the square boss 45 which abuts the edges 47, 49 of the bottom flange plates 21, 23.

It is structurally advantageous that the turning of each carriage bolt 39 is stopped by the juxtaposed edges 47, 49 of the bottom flange plates. As shown in the right side view of the I-beam 11, FIG. 6, a plurality of carriage bolts 39 can be positioned along the beam at selected locations. The force exerted against each parallel plate edge 47, 49 by the square boss 45 of a carriage bolt is a compression force which spreads out through each plate 21, 23 to the walls 17, 19 of the cavity 37. This reduces stress concentrations at each carriage bolt 39 location.

To the contrary, if a machine bolt or stove bolt were substituted, the walls 17, 19 of the Y-cross-section cavity 37 would have to refrain each substituted bolt head from turning. This would leave each machine or stove bolt head applying a preloaded stress concentration to a localized area 51 along each of the walls 17, 19. With the flexing, torque, and bending forces exerted on a boat trailer side rail, the head of such substituted machine or stove bolt cause the walls 17, 19 to fail at their localized locations 51, causing the walls 17, 19 to bulge outwardly at the stress points 51 until the machine or stove bolt head is no longer held fast.

The I-beam slot opening 27 and cavity 37 eliminates the previous need for right hand and left hand boat trailer rails which required to be drilled or punched with non-symmetrical hole patterns.

Figure 7:
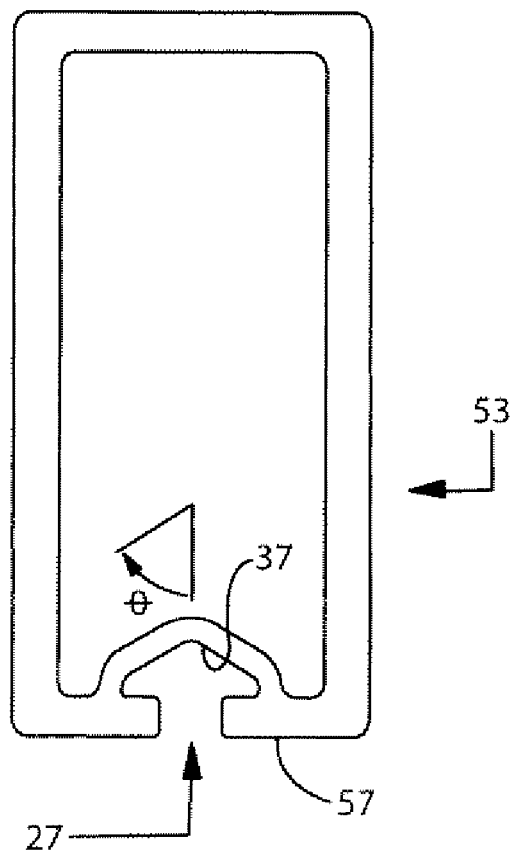
FIG. 7 is an end view of the structural member implemented as a rectangular tube.

Aluminum alloy structural members for vehicles save weight, and are not limited to an I-beam cross-sectional shape. For example, a rectangular tube 53, FIGS. 7 and 8, and a C-channel 55, FIGS. 9 and 10, often used for motor vehicle structural members can each carry an identical cavity 37 and slot opening 27 in their respective bottom flanges 57, 59.

Figure 3:
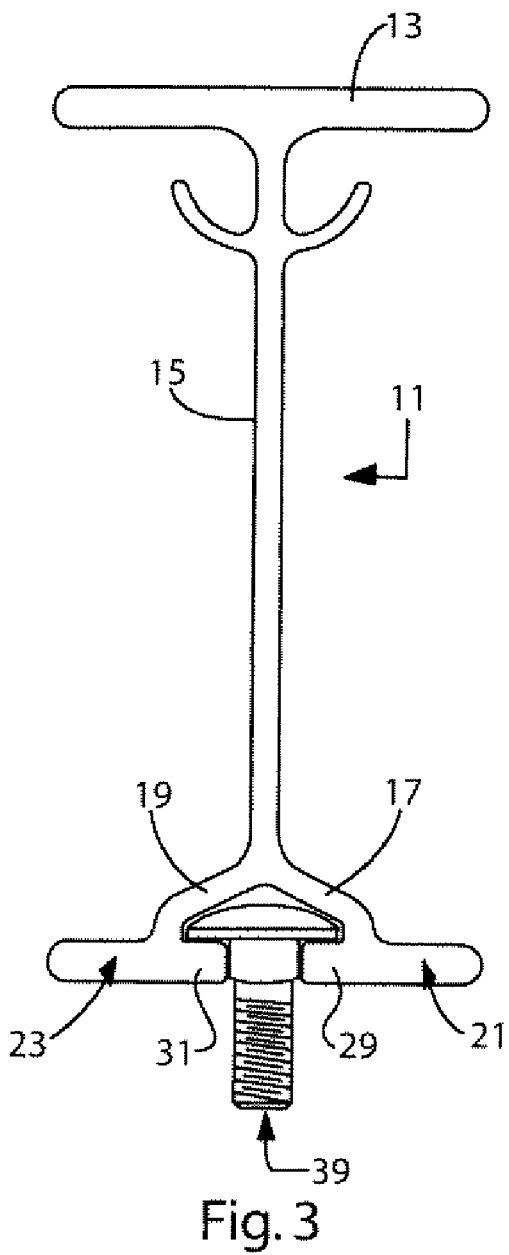
FIG. 3 is an end view of the I-beam of FIG. 1, with a carriage bolt in place in the slot.
Figure 6:
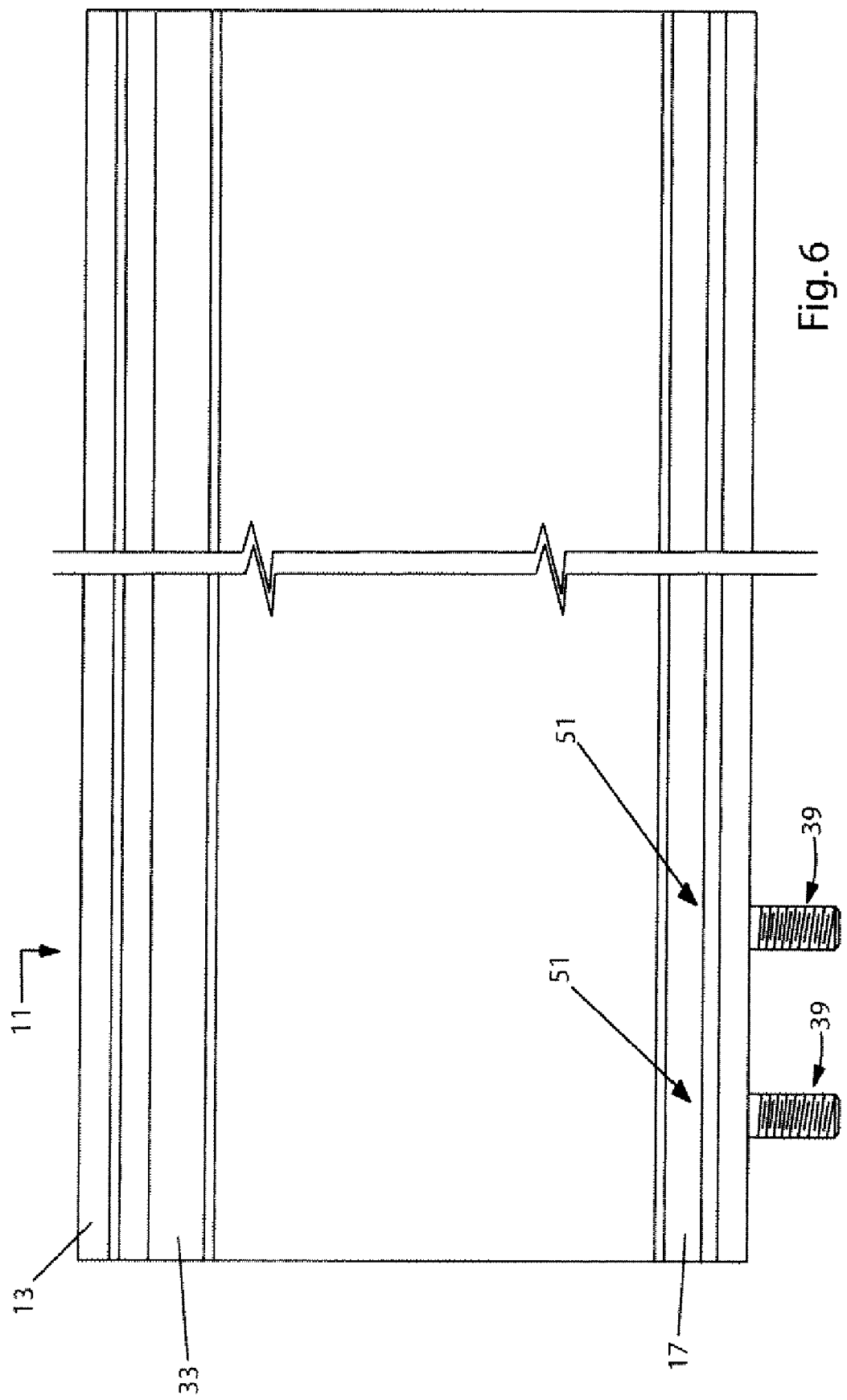
FIG. 6 is a right side view of the I-beam of FIG. 2 showing two carriage bolts in place.
Figure 8:
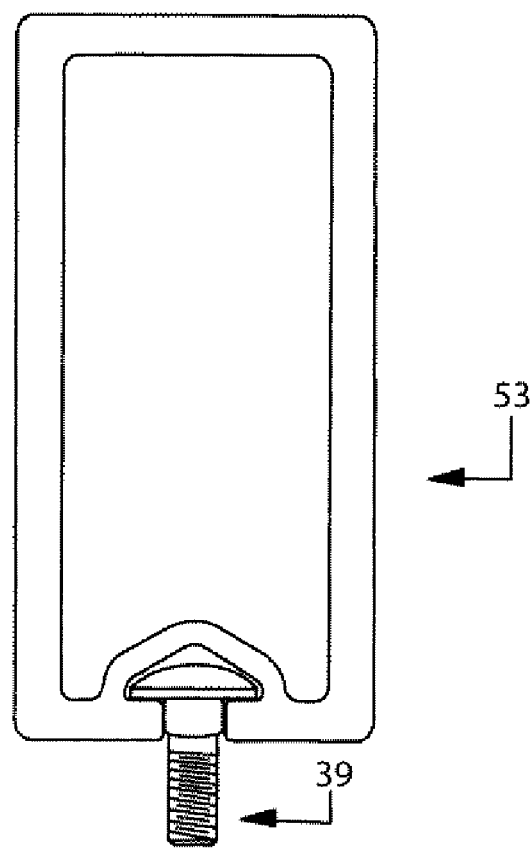
FIG. 8 is an end view of the rectangular tube of FIG. 7 with a carriage bolt held in the slot.
Figure 9:
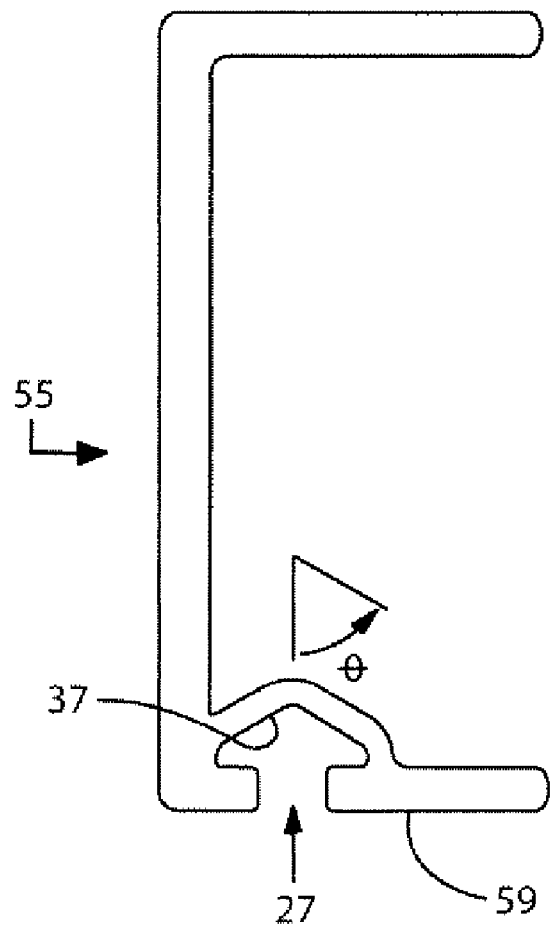
FIG. 9 is an end view of the structural member implemented as a C-channel.
Figure 10:
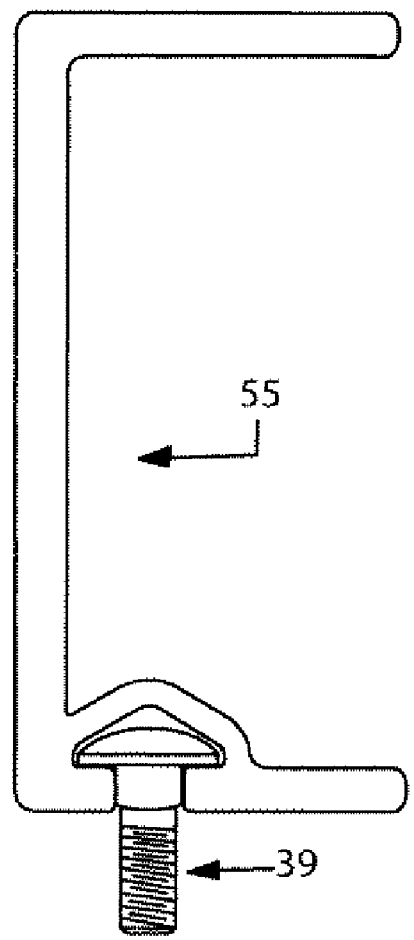
FIG. 10 is an end view of the C-channel of FIG. 9 with a carriage bolt held in the slot.

The elongate structural walls of an I-beam, a tube, and a C-channel meet at right angles. This is seen in FIGS. 3, 8 and 10, where the I-beam web meets the top flange, where the tube top wall meets the side walls, and where the C-channel back wall meets the top wall. The two walls 17, 19 defining the "cap" of the cavity 37 are joined to the bottom wall or flange at other than a right angle, i.e., normal angle of 90 degrees.

The shape of each cavity 37 accepts the head of a carriage bolt 39 and holds the boss of the bolt fixed with the juxtaposed edges defining the slot opening 27.

A further advantage of the present invention is not only does the design distribute over a broader area, the preloaded stress force from a tightened bolt, and the continued forces exerted by the bolt when the structural member undergoes bending and torsion forces, but also that the initial force vector is limited to compression, and when it passes to the walls 17, 19 of the cavity 37 by the spreading of the slot opening, that force has two vectors, a first in a bending moment and a second in a compression force. This further reduces the tangential component of force on the wall 17 and 19.

Many changes can be made in the above-described invention without departing from the intent and scope thereof. It is therefore intended that the above description be read in the illustrative sense and not in the limiting sense Substitutions and changes can be made while still being within the scope and intent of the invention and of the appended claims.

The invention claimed is:

1. An elongate structural member for a vehicle, comprising:
   a first elongate structural wall extending in a first plane;
   a second elongate structural wall connected to said first structural wall and extending in a second plane orthogonal to said first plane;
   a cavity extending longitudinally along said second elongate structural wall having an entranceway separating said second elongate structural wall into two elongate plates having two connected cavity walls forming said connection of said first and second structural walls, wherein said second structural wall has juxtaposed lip portions extending into said cavity entranceway;
   wherein said cavity walls do not extend parallel to either of said first or second structural walls;
   wherein the cross-section of said longitudinal cavity is mushroom-shaped; and
   also including a fastener, said fastener having a rounded head with a threaded shank extending therefrom, and a boss on said shank having at least two flat surfaces, said boss being positioned between said head and said threaded shank, wherein said boss flat surfaces abut juxtaposed faces of said juxtaposed lip portions of said second structural wall edges when said fastener head is seated upon said juxtaposed lip portions; and
   wherein said cavity walls each meet at a rounded, radius corner;
   wherein said cavity walls form a rounded mushroom-shaped dome on said cavity.

2. The structural member of claim 1, wherein said mushroom shaped longitudinal cavity is open at one end, and wherein said elongate second structural wall includes a slot being open adjacent said open end of said longitudinal cavity.

3. The structural member of claim 2, wherein said fastener is a carriage bolt, having a round head, a square boss thereunder, and a threaded shank extending therefrom, said carriage bolt head being capable of sliding into said longitudinal mushroom shaped cavity to abut said second structural member cavity facing lip portions, wherein said slot extends longitudinally along said second structural wall and opens into said cavity, wherein said juxtaposed faces of said juxtaposed lip portions project into said slot, wherein said carriage bolt boss extends through said slot to abut the juxtaposed faces of said lip portions to be refrained from rotation.

4. The structural member of claim 3, wherein said two cavity walls connect to said first structural wall at angles of 20-60 degrees.

5. The structural member of claim 1, also including a third elongate structural wall to form a C-channel shaped structural member.

6. The structural member of claim 4, also including a third and fourth elongate structural walls to form a tube shaped structural member.

7. The structural member of claim 1 also including a third elongate structural wall to form an I-beam shaped structural member.

8. The I-beam structural member of claim 7, wherein said first structural wall is its web, said second structural wall is its bottom flange, and said third structural wall is its top flange.

9. The I-beam structural member of claim 8 wherein said two cavity walls are formed by a bifurcation of said web into a Y-shape connecting to said bottom flange.

10. The I-beam structural member of claim 9 also including at least one wiring gutter being directly connected to said web portion.

11. An elongate structural member for a vehicle, comprising:
    a first structural wall being the web of a beam extending in a first plane;
    a second structural wall being the bottom flange of said beam which is connected to said web in a second plane orthogonal to the plane of said web;
    a slot extending longitudinally through said bottom flange and separating said bottom flange into two sequentially extending plates; and
    a cavity extending longitudinally along said beam having two interconnected cavity walls, said cavity walls forming an enclosure being formed by a bifurcation of said web wall connected to said bottom flange into a Y-shape wherein neither cavity wall is parallel to the beam flange plates;
    wherein said cavity enclosure is rounded dome-like shaped.

12. The structural member of claim 11, wherein said longitudinal cavity enclosure is mushroom-shaped.

13. The structural member of claim 12, wherein said cavity walls respectively connect to said bottom flange respective plates at an angle of 55-75 degrees.

14. The structural member of claim 13, wherein said cavity walls meet at an interior angle of 30-70 degrees.

15. The structural member of claim 14, wherein all connections of said walls meet at rounded radiuses and wherein said bottom flange plates each have a juxtaposed portion extending forming a lip extending into the entranceway of said cavity.

16. The structural member of claim 14 also including an upwardly curved wall extending from said beam web forming a uniform wall thickness wiring gutter extending to about 90 degrees from horizontal.

17. An elongate structural beam member for a vehicle, comprising:

a first elongate wall member extending in a first plane;

a second elongate wall member extending in a second plane and being connected to said first elongate wall member; and a cavity extending longitudinally along said second elongate structural member, said cavity having an opening extending through the length of said second elongate wall member and an opening at least at one end of said elongate beam member, said cavity having walls forming an enclosure;

wherein said cavity walls meet each other and meet said second elongate wall member with rounded radiuses;

wherein said cavity enclosure has a rounded dome.

\* \* \* \* \*